United States Patent
Shiba et al.

(12)

(10) Patent No.: US 6,309,783 B1
(45) Date of Patent: *Oct. 30, 2001

(54) COLOR FILTER AND METHOD OF MANUFACTURING THE SAME

(75) Inventors: Shoji Shiba, Sagamihara; Hideaki Takao, Machida; Ryuichi Yokoyama; Masashi Sobue, both of Yokohama; Takeshi Okada, Zushi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,977

(22) Filed: Dec. 21, 1999

(30) Foreign Application Priority Data

Dec. 22, 1998 (JP) .................................... 10-363615
Dec. 22, 1998 (JP) .................................... 10-363616

(51) Int. Cl.[7] ............................. G02B 5/20; G02F 1/1335
(52) U.S. Cl. ................................. 430/7; 347/107; 349/106
(58) Field of Search .................... 430/7; 347/106, 347/107; 349/106

(56) References Cited

U.S. PATENT DOCUMENTS

| 5,650,867 | 7/1997 | Kojima et al. ................. 349/104 |
| 5,712,064 | 1/1998 | Miyazaki et al. ................. 430/7 |
| 5,716,740 | 2/1998 | Shiba et al. ................. 430/7 |
| 5,721,077 | 2/1998 | Takao et al. ................. 430/7 |
| 5,721,089 | 2/1998 | Takao et al. ................. 430/283.1 |
| 5,726,724 | 3/1998 | Shirota et al. ................. 349/106 |
| 5,734,456 | 3/1998 | Takao et al. ................. 349/106 |
| 5,898,208 | 4/1999 | Miyazaki et al. ................. 349/106 |
| 5,948,576 | 9/1999 | Shirota et al. ................. 430/7 |
| 5,989,757 | * 11/1999 | Satoi ................. 430/7 |

FOREIGN PATENT DOCUMENTS

| 59-75205 | 4/1984 | (JP) . |
| 63-235901 | 9/1988 | (JP) . |
| 1-217302 | 8/1989 | (JP) . |

* cited by examiner

*Primary Examiner*—John A. McPherson
(74) *Attorney, Agent, or Firm*—Fitzpatrick, Cella, Harper & Scinto

(57) ABSTRACT

A color filter comprising a substrate, a shielding layer formed on the substrate and having an opening, color mixing prevention barriers formed on the shielding layer, and colored portions formed between the color mixing prevention barriers, the optical density of the colorants in the colored portions being raised toward the substrate.

20 Claims, 7 Drawing Sheets

COLOR FILTER AND METHOD OF MANUFACTURING THE SAME

BACKGROUND OF THE INVENTION

1. Field of the Invention

This invention relates to a color filter to be suitably used for a color television set or the display device of a personal computer and also to a method of manufacturing the same. More particularly, the present invention relates to a color filter having colored portions of the three primary colors by means of an ink-jet system. The present invention also relates to a liquid crystal element substrate using such a color filter and a liquid crystal element formed by using such a substract.

2. Related Background Art

The technological development in the field of personal computers in recent years, portable personal computers in particular, has produced an ever-increasing demand for liquid display devices, particularly for color liquid crystal display devices. However, the demand can be met only when such display devices are supplied at reduced cost. In more specific terms, there is a strong demand for less costly color filters that take a significant part in the overall cost of manufacturing display devices.

While efforts have been paid to meet the demand while satisfying the requirements for the performance of color filters, no technology has been established to satisfy the requirements. Firstly, typical known processes for preparing color filters will be discussed.

First, a dyeing process is known. With this process, a water-soluble polymeric material is formed on a glass substrate as material to be colored and then it is patterned to show a desired profile by photolithography. Thereafter, the obtained pattern is immersed in a dye bath to produce a colored pattern. This dyeing step is repeated three times for the three primary colors of red (R), green (G) and blue (B) to obtain a colored layer of R, G and B on the substrate.

Second, there is known a pigment dispersing process, which is most popular in recent years. With this process, a photosensitive resin layer containing a pigment in a dispersed state is formed on a substrate and then the layer is patterned to produce a mono-color pattern. Then, this pattern forming step is repeated three times to obtain a layer colored to the three primary colors of R, G and B.

Third, an electrodeposition process is known. With this process, a transparent electrode is formed on a substrate by patterning and a first color is produced by means of electrodeposition of immersing the patterned electrode into an electrodeposition coating solution containing a pigment, resin and an electrolyte. Then, this step of producing a color is repeated three times to form a colored layer of the three primary colors of R, G and B. Finally, the formed layer is baked to complete the process.

Fourth, there is known a process of dispersing pigments into thermosetting resin, repeating a printing operation three times for the three primary colors of R, G and B and curing the resin to produce a colored layer.

With any of the above listed processes, a protection layer is generally formed on the colored layer.

What is common to all the above listed processes is that a same step has to be repeated three times for forming a colored layer of the three primary color of R, G and B to consequently raise the manufacturing cost. Additionally, a manufacturing method involving a large number of steps is normally accompanied by a low yield. Furthermore, patterns that can be formed by an electrodeposition process are limited in terms of profile so that such a process cannot be applied without difficulty to active matrix type (so-called TFT type) liquid display devices comprising TFTs (thin film transistors). On the other hand, a printing process is not suited for finely pitched patterns because of the problem of poor resolution that accompanies the process.

Japanese Patent Application Laid-Open Nos. 59-75205, 63-235901 and 1-217302 propose methods of manufacturing a color filter by using an ink-jet system.

Methods of manufacturing a color filter by using an ink-jet system provide the advantages of:

(1) simpleness of the manufacturing process;

(2) low manufacturing cost; and (3) a wide choice of colorants because dyes can be used.

Dyes are much more abundant if compared with pigments so that desired colors can be reproduced almost freely depending on the application. Additionally, a color filter realized by using dyes normally provides a high contrast if compared with a color filter prepared by using pigments.

However, compared with pigments, dyes are normally accompanied by the problems of:

(A) poor heat resistance, and (B) high solubility to water and organic solvents.

Thus, a color filter prepared by using dyes typically involves the following problems:

(A) When forming a protection layer on the colored portions of the color filter by spin-coating, the dyes contained in the colored portions can cause migration around the interface thereof due to the organic solvent contained in the protection layer. Then, the adhesion of the colored portions to the protection layer can be deteriorated and/or the protection layer can become colored.

(B) When forming a transparent electro-conductive film on the colored portions, the dyes contained in the colored portions can become oxidized around the surface thereof because they are exposed to an oxygen-containing atmosphere at high temperature. When the dyes are oxidized, their color tones change and/or the contrast of the color filter can be degraded.

SUMMARY OF THE INVENTION

In view of the above circumstances, it is therefore an object of the present invention to provide a high performance color filter that is free from the above identified problems and can effectively prevent the problem of coloring the protection layer and deteriorating the adhesion of the protection layer and the problem of degradation of the contrast of the color filter when forming a transparent electro-conductive film. Another object of the present invention is to provide a highly reliable liquid crystal element substrate comprising such a color filter and also a liquid crystal element having excellent color display characteristics.

According to the invention, the above objects are achieved by providing a color filter comprising a substrate, a shielding layer formed on the substrate and having openings, and colored portions formed in the openings, the optical density of the colorants in the colored portions being raised toward the substrate.

According to the invention, there is also provided a color filter comprising a substrate, a shielding layer formed on the substrate and having an opening, color mixing prevention barriers formed on the shielding layer, and colored portions formed between the color mixing prevention barriers, the optical density of the colorants in the colored portions being raised toward the substrate.

According to the invention, there is also provided a method of manufacturing a color filter, comprising the steps of forming a shielding layer having openings on a substrate, forming photosensitive resin on the substrate and the shielding layer, coloring the photosensitive resin, and rinsing the photosensitive resin.

According to the invention, there is also provided a method of manufacturing a color filter, comprising the steps of forming a shielding layer having openings on a substrate, applying inks to the openings, producing colored portions by curing the inks, and rinsing the colored portions.

According to the invention, there is also provided a method of manufacturing a color filter, comprising the steps of forming a shielding layer having openings on a substrate, forming photosensitive resin on the substrate and the shielding layer, forming color mixing prevention barriers by patterning the photosensitive resin by exposing it to light, coloring the photosensitive resin between the color mixing prevention barriers, and rinsing the photosensitive resin.

DETAILED DESCRIPTION OF THE PREFERRED EMBODIMENTS

FIGS. 1A through 1H show a process diagram of an embodiment of a first method of manufacturing a color filter according to the invention and are schematic sectional views which correspond to the respective manufacturing steps (a) through (h) that will be described hereinafter.
Step (a)
A shielding layer 2 (normally referred to as black matrix) having openings is formed on a transparent substrate 1 by using black resin. While a glass substrate may preferably be used for the transparent substrate 1 of a color filter according to the invention, the material of the substrate is not limited to glass and it may alternatively made of a plastic material or some other appropriate material provided that it has properties required for a color filter to be used for a liquid crystal element particularly in terms of transparency and mechanical strength.

Figure 1A:
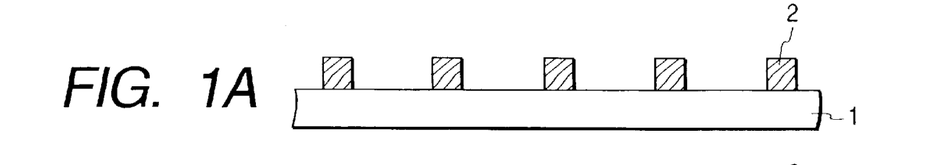
FIGS. 1A, 1B, 1C, 1D, 1E, 1F, 1G and 1H show a process diagram of an embodiment of a method of manufacturing a color filter according to the invention.

The black resin to be used for forming the shielding layer 2 is preferably a resin composite containing one or more colorants to make it appear black. The use of commercially available black resist may be a recommended choice. The shielding layer 2 can be produced by patterning black resist by means of photolithography, by patterning a black resin composite serving as resist by means of photolithography, or by patterning a black resin composite by means of printing, and subsequently thermosetting the obtained pattern of the shielding layer.

Figure 1B:
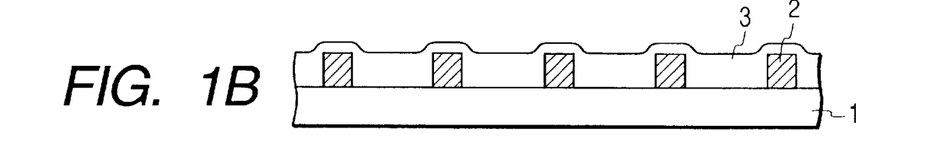

For the purpose of the invention, the height of the shielding layer 2 may be determined within a range that can provide a satisfactory shielding effect, however, it is preferably between 1 and 2 $\mu$m from the viewpoint of forming a uniform photosensitive resin composite layer, which will be described hereinafter.
Step (b)

A negative type photosensitive resin compound layer 3 that shows a good ink absorptivity after the irradiation of light on the entire surface of the transparent substrate 1. For the purpose of the present invention, any photosensitive resin composite may be used provided that it has a negative photo-reactivity, shows a good ink absorptivity after the irradiation of light and can be cured by heat treatment. Specific examples of the photosensitive resin composite include a system obtained by adding a photo-initiating agent such as ammonium dichromate to a natural polymer such as gelatin or casein, a system obtained by adding a photo-initiating agent such as bis-azide to a synthetic polymer and a system obtained by adding a photo-polymerizable compound and a photo-initiating agent such as benzophenone to a synthetic polymer. Synthetic polymers not having any photo-reactivity per se that can be used for the purpose of the invention include a copolymer of an anionic dyeable monomer, such as (N,N-dimethylamino)ethylmethacrylate and 3-(N,N-dimethylamino)propylacrylamide, and a hydrophilic monomer, such as acrylic acid and hydroxyethylmethacrylate. Polymers having a photo-reactivity that can be used for the purpose of the invention non-limitatively include copolymers of any of the above listed copolymers, which further include vinylcinnamate, vinylpyrrolidone or trimethylolpropanetrimethacrlate.

Figure 1C:
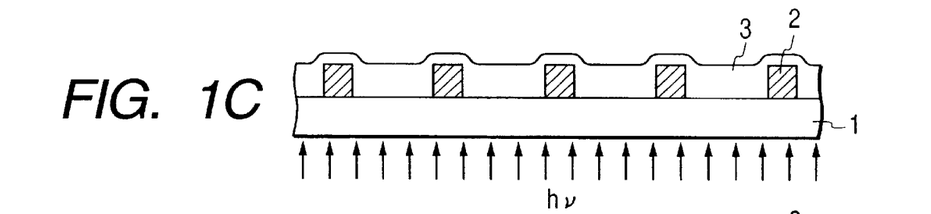

The photosensitive resin composite is applied onto the substrate and the shielding layer by an appropriate application technique selected from spin-coating, dye-coating, roll-coating, bar-coating, spray-coating and dip-coating, and the use of a spin-coating technique is especially preferable from the viewpoint of applying the composite uniformly on the substrate having undulations produced by the shielding layer.
Step (c)

The photosensitive resin composite layer 3 in the region of the openings of the shielding layer 2 is irradiated with light to cure the resin composite in the openings. While the photosensitive resin composite layer 3 may be irradiated with light from the front surface thereof, using a photomask, the shielding layer 2 can preferably be utilized as a mask to eliminate the use of a photomask and the need of aligning the photomask and the shielding layer 2 to consequently improve the manufacturing efficiency and the reliability of the color filter by irradiating the photosensitive resin layer 3 with light from the rear surface of the transparent substrate 1.

Figure 1D:
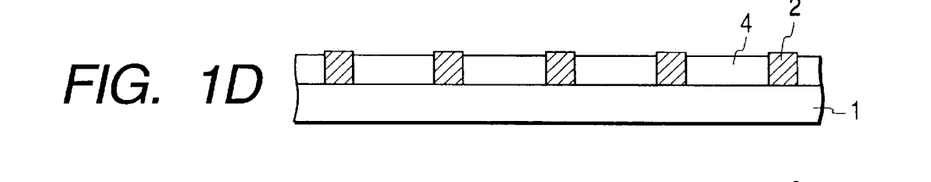

Step (d)

Then, the photosensitive resin composite is subjected to a development process to remove any part thereof that is not exposed to light and remaining on the shielding layer 2. Thus, the cured photosensitive resin composite is left in the openings of the shielding layer 2 to form coloring portions 4. While an aqueous solution type developer or an organic solvent type developer can be used for the development process, water or an alkaline aqueous solution may preferably be used from the viewpoint of easy handling and safety of the process.

While the photosensitive resin composite may be dried after the development process by spin-drying, by the use of an air knife or by heating, the temperature of the drying process should be such that it does not promote the thermosetting reaction of the photosensitive resin composite.

Figure 1E:
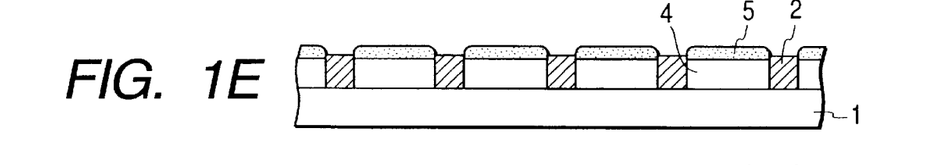

Step (e)

Coloring inks 5 of R, G and B are applied to the respective coloring portions 4 by using an ink-Jet recording apparatus (not shown). While colorants that can be used for coloring inks for the purpose of the invention may be dyes or pigments, dye-type inks are preferably used in view of the fact the present invention is intended to solve the problems of known color filters realized by using dyes.

A preferable ink carrier to be used for an ink-jet recording apparatus is a mixed solvent obtained by mixing water and a water-soluble organic solvent. For the purpose of the invention, not ordinary water containing various ions but ion-exchanged water (de-ionized water) is preferably used.

Other water soluble organic solvents that can also be used for the purpose of the invention include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol, amides such as dimethylformamide and dimethylacetamide, ketones such as acetone, keto alcohols such as diacetone alcohol, ethers such as tetrahydrofuran and dioxane, polyalkyleneglycols such as polyethyleneglycol and polypropyleneglycol, alkyleneglycols having alkylene radicals with 2 to 4 carbon atoms such as ethyleneglycol, propyleneglycol, butyleneglycol, triethyleneglycol, thiodiglycol, hexyleneglycol and diethyleneglycol, glycerols, lower alkylethers of polyhydric alcohols such as ethyleneglycolmonomethylether, diethyleneglycolmethylether and triethyleneglycolmonomethylether, N-methyl-2-pyrrolidone and 2-pyrrolidone. Of the above listed water soluble organic solvents, polyhydric alcohols such as diethyleneglycol, lower alkylethers of polyhydric alcohols such as triethyleneglycolmonomethylether and N-methyl-2-pyrrolidone may preferably be used.

In addition to the above ingredients, a surface active agent, a defoaming agent and/or an antiseptic may also be added if necessary for making the inks show desired physical properties.

Inks that can be used for the purpose of the invention may be liquid at a room temperature or may be such that they are solidified at or below a room temperature but softened or liquefied at a room temperature or they are in a liquid state when ejected from a nozzle in view of the fact than the ink temperature is adjusted to be between 30 and 70° C. in an ordinary ink-jet recording apparatus in order to make the ink show a desired viscosity level.

Ink-jet systems that can be used for the purpose of the invention include those of the bubble jet type using electro-thermal converters as energy generating elements and those of the piezo-jet type using piezoelectric elements. Such systems normally provide a wide choice for the area to be colored and the coloring pattern.

Figure 1F:
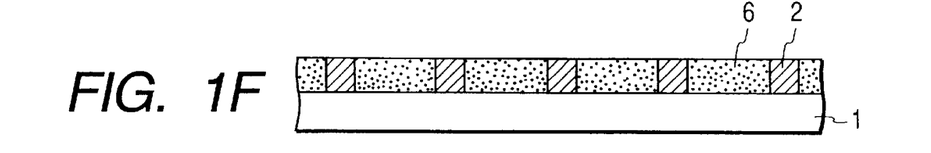

Step (f)

After allowing the coloring inks 5 to disperse sufficiently in the coloring portions 4, the inks are dried, if necessary, and the coloring portions 4 that have been colored are cured by heat to produce colored portions 6.

Figure 1G:
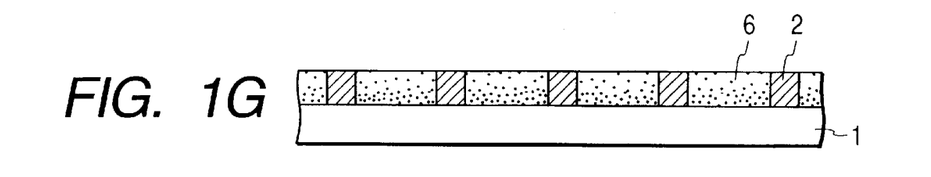

Step (g)

The colored portions 6 are rinsed to remove the colorants on the surface thereof. Rinsing solutions that can be used for the purpose of the invention are those adapted to dissolve the colorants. When the colorants are dyes, they can be removed effectively by means of pure water or an alkaline aqueous solution. Rinsing techniques that can be used for the purpose of the invention non-limitatively include dip-rinsing, spin-rinsing and shower-rinsing.

The colorants on the surface of the colored portions 6 are rinsed and removed with this step. As a result, the colorants come to show an optical density distribution along the depth of the colored portions, the optical density of the colorants in said colored portions being raised toward the transparent substrate 1.

Figure 1H:
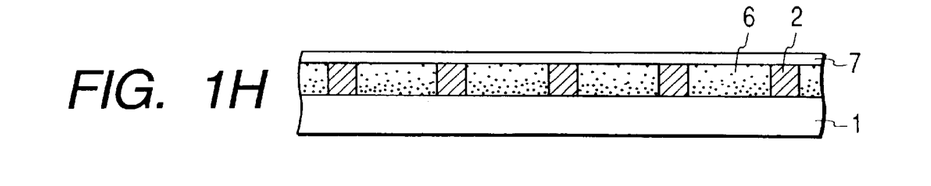

Step (h)

A protection layer 7 is formed whenever necessary. Materials that can be used for the protection layer 7 include resin materials of the photo-setting type, the thermosetting type and the photo-thermosetting type and inorganic films formed by evaporation or sputtering. In other words, any materials that is satisfactorily transparent when used for a color filter and can withstand the subsequent process of forming a transparent electro-conductive film and that of forming an oriented film can be used for the purpose of the invention.

Since the optical density of the colored portions 6 is low at the surface in a color filter according to the invention, the migration of the colorants from the colored portions is minimized and the protection layer 7 can be made to show an excellent adhesion. If the protection layer 7 is not formed in a color filter according to the invention and a transparent electro-conductive film is formed directly on the colored portions 6 to prepare a liquid crystal element, the color filter can minimize the degradation of the color tone due to the oxidation of the dyes on the surface of the colored portions 6 that can arise in the oxygen-containing atmosphere in the step of forming the transparent electro-conductive film because of the fact that the optical density of the colored portions 6 is low at the surface.

Now, a second method of manufacturing a color filter according to the invention will be described. FIGS. 2A through 2E are schematic sectional views of a color filter being prepared in the second method of manufacturing a color filter according to the invention and correspond to the respective manufacturing steps (a) through (e) that will be described hereinafter. The same components as those of the color filter of FIGS. 1A through 1H are denoted respectively by the same reference symbols and will not be described any further.

Figure 2A:
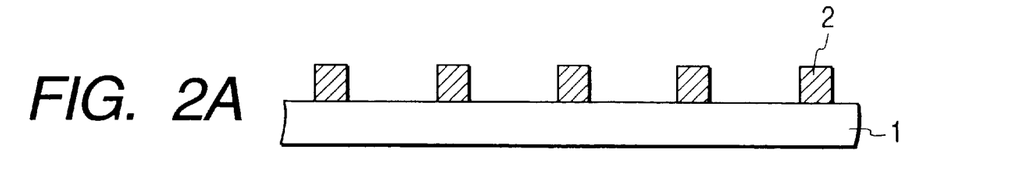
FIGS. 2A, 2B, 2C, 2D and 2E show a process diagram of another embodiment of a method of manufacturing a color filter according to the invention.

Step (a)

A shielding layer 2 is formed on a transparent substrate 1. This step is identical with Step (a) in FIG. 1A and the members involved in this step are also the same as those of FIG. 1A.

Figure 2B:
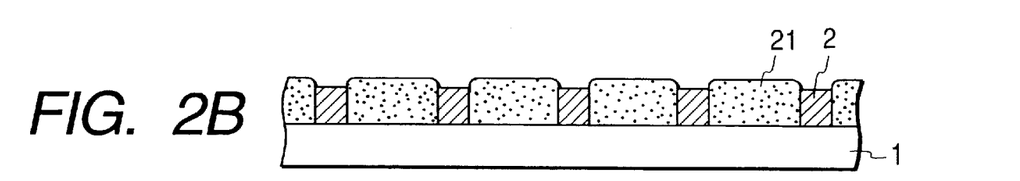

Step (b)

Curable type inks of R, G and B are applied to the openings of the shielding layer 2 located at respective positions by means of an ink-jet recording apparatus (not shown).

Curable type inks 21 to be used for the purpose of the invention are those that are cured when energy is applied thereto preferably in the form of irradiation of light or heat treatment and contain one or more bridgeable monomers and/or polymers that can fix the dyes or pigments of the inks. Specific examples of the bridgeable compound that can be used for the purpose of the invention include polymerizable oligomers such as epoxyacrylate, urethaneacrylate, polyesteracrylate and polyetheracrylate, polymerizable monomers such as mono-functional acrylates and multi-functional acrylates and polymers of such monomers. If necessary, one or more bis-azido compounds, a radical type initiating agent and/or a cation type initiating agent may be added to the inks.

Figure 2C:
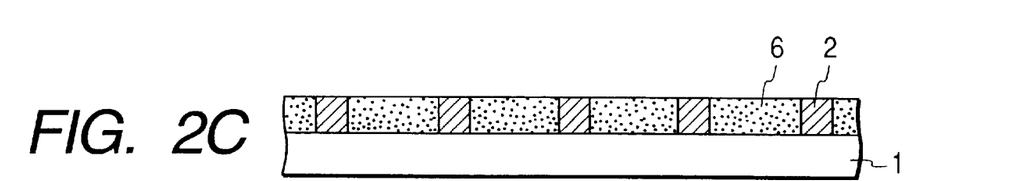

Step (c)

The curable type inks 21 are cured by means of an appropriate process such as irradiation of light or heat treatment to produce colored portions 6.

Figure 2D:
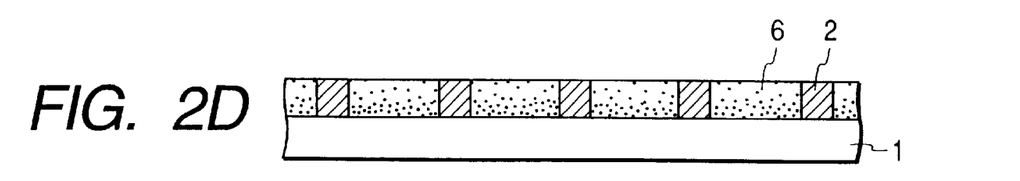

Step (d)

The colored portions 6 are rinsed to remove the colorants on the surface thereof. This step corresponds to Step (g) of FIG. 1G and any of the rinsing solutions and the rinsing methods described above for Step (g) of FIG. 1G may also be used in this second method.

Figure 2E:
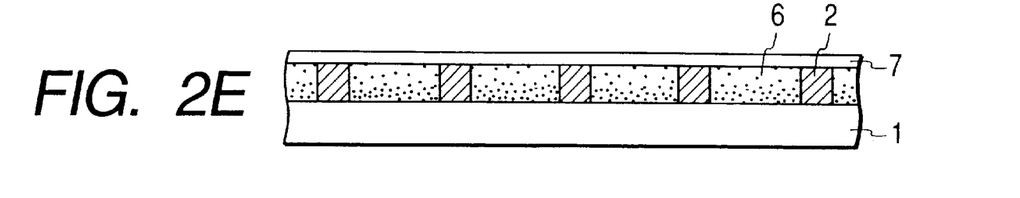

Step (e)

If necessary, a protection layer 7 is formed on the colored portions 6 in a manner as described above by referring to the first method.

FIGS. 3A through 3G are schematic sectional views of a color filter being prepared in another embodiment of a method of manufacturing a color filter according to the invention and correspond to the respective manufacturing steps (a) through (g) that will be described hereinafter. The same components as those of the color filter of FIGS. 1A through 1H are denoted respectively by the same reference symbols and will not be described any further.

Figure 3A:
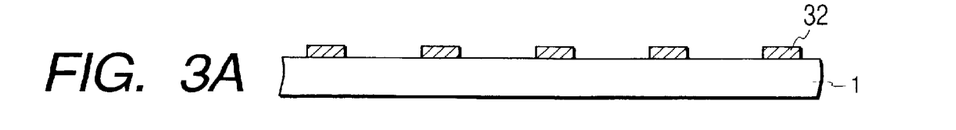
FIGS. 3A, 3B, 3C, 3D, 3E, 3F and 3G show a process diagram of still another embodiment of a method of manufacturing a color filter according to the invention.

Step (a)

A shielding layer 32 having openings is formed on a transparent substrate 1.

More specifically, the shielding layer 32 is formed by forming a film of chromium or the like by means of a sputtering or evaporation technique and patterned to show a desired profile. The metal shielding layer 32 preferably has a thickness between 0.1 and 0.5 $\mu$m.

Figure 3B:
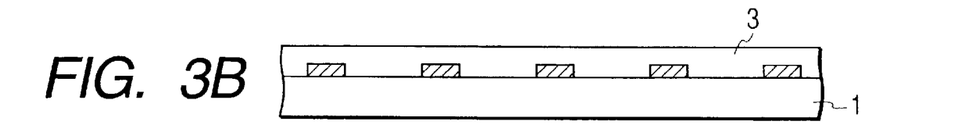

Step (b)

An ink-receiving layer 3 of a photosensitive resin composite that has ink absorptivity which changes by the irradiation of light with or without heat treatment is formed on the surface of the transparent substrate 1 including the shielding layer 32. The photosensitive resin composite to be used in this embodiment may be of the negative type that loses or reduces its ink absorptivity as a result of irradiation of light with or without heat treatment or of the positive type that reveals or increases its ink absorptivity as a result of irradiation of light with or without heat treatment.

Specific examples of base resin material that can be used for negative type photosensitive resin composites include acrylic resin, epoxy resin and silicone resin having functional groups, such as hydroxy groups, carboxyl groups, alkoxy groups and amide groups, cellulose derivatives such as hydroxypropylcellulose, hydroxyethylcellulose methylcellulose and carboxymethylcellulose, modified products of the cellulose derivatives, polyvinylpyrrolidone, polyvinylalcohol and polyvinylacetal. A bridging agent or a photo-initiating agent may also be used in order to make such resin chemically react by irradiation of light with or without heat treatment. Specific examples of the bridging agent include melamine derivatives such as methylolmelamine, whereas specific examples of the photo-initiating agent include dichromate, bis-azide compounds, radial type initiating agents, cation type initiating agents and anion type initiating agents. A plurality of such photosensitizers may be combined or such a photosensitizer may be combined with some other sensitizer for the purpose of the invention.

Specific examples of the positive type photosensitive resin composite include silicone type resins having disilane bonds such as polysilane, mixtures of resin having hydroxy groups, such as hydroxypropylcellulose, polyvinylalcohol, cresolnovolac resin and polyparahydroxystyrene, and naphthoquinonediazide, and mixtures of resin formed by blocking the hydroxy groups of the resin selected from the above listed compounds having hydroxy groups by means of acetyl groups or trimethylsilyl groups and a cation type photo-initiator.

The selected photosensitive resin composite is then applied onto the transparent substrate 1 by means of an appropriate application technique such as spin-coating, roll-coating, bar-coating, spray-coating and dip-coating and, if necessary, pre-baked to produce a ink-receiving layer 3. Any appropriate process may be used for forming the ink-receiving layer 3.

Figure 3C:
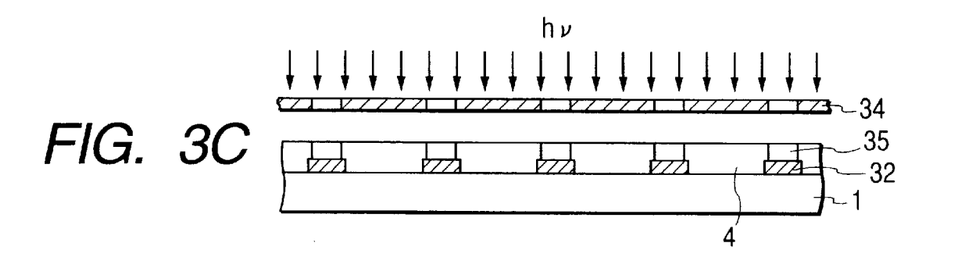

Step (c)

The ink-receiving layer 3 is patterned by irradiation of light, using a photomask 34 to produce non-coloring portions 35 showing a low ink absorptivity (or not showing any ink absorptivity) and coloring portions 4 showing a high ink absorptivity (or showing an ink absorptivity). The non-coloring portions 35 operate as a color mixing prevention barrier. In the following description of this mode of carrying out the invention, the ink-receiving layer is made of a negative type photosensitive resin composite that loses its ink absorptivity when exposed to light. As described above, non-coloring portions 35 are formed on the shielding layer 32 in this step. The non-coloring portions 35 prevent mixing of inks of different colors between the coloring portions 4.

As the non-coloring portions 35 are formed on the shielding layer 32 and made to have a width smaller than that of the shielding layer 32, the colored portions 6, which will be described hereinafter, can extend to overlap the shielding layer 32 to eliminate any risk of color skip.

Figure 3D:
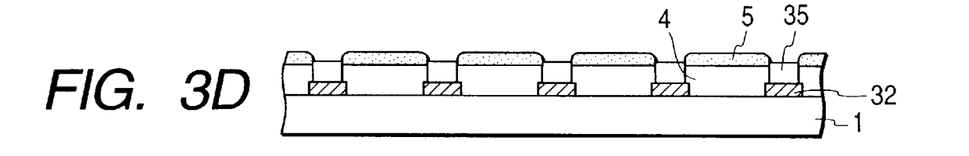

Step (d)

Inks 5 of R, G and B are applied to the coloring portions 4 located in respective positions by means of an ink-jet recording apparatus (not shown).

Figure 3E:
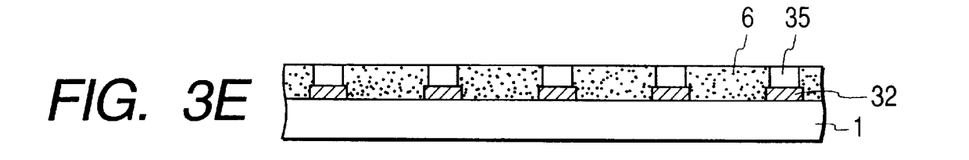

Step (e)

When the colorant inks permeate satisfactorily into the respective coloring portions 4, they are subjected to a drying process, if necessary, and the coloring portions that have been colored are cured by subjecting them to irradiation of light and/or heat treatment to produce colored portions 6.

Figure 3F:
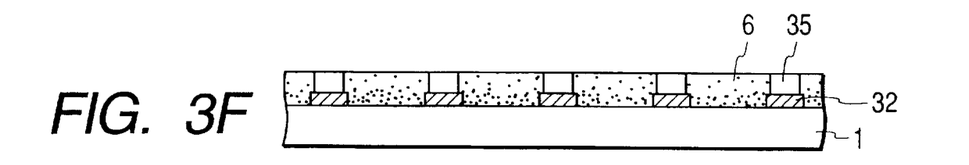

Step (f)

The colored portions 6 are rinsed to remove the colorants adhering to the surface thereof.

Figure 3G:
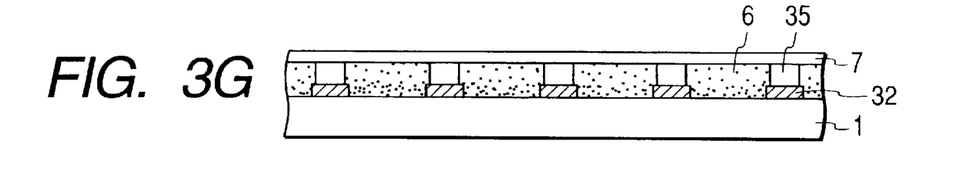

Step (g)

If necessary, a protection layer 7 is formed on the surface.

A liquid crystal element substrate according to the invention is prepared by forming a transparent electro-conductive film on a color filter as shown in FIG. 1G or 1H, FIG. 2D or 2E or FIG. 3F or 3G. As described above, a color filter according to the invention shows a low optical density on the surface thereof as the colorants on the surface of the colored portions are rinsed and removed. Thus, the liquid crystal element substrate prepared by forming a transparent electro-conductive film thereon is hardly affected by the colorants and hence can provide a good adhesion between the protection layer and the colored portions. In other words, the liquid crystal element substrate can minimize the degradation of the color tone of the colored portions due to the oxidation of the colorants on the surface of the colored portions 6 that can arise when the transparent electroconductive film is formed.

Now, a liquid crystal element comprising a color filter according to the invention will be described.

Figure 4:
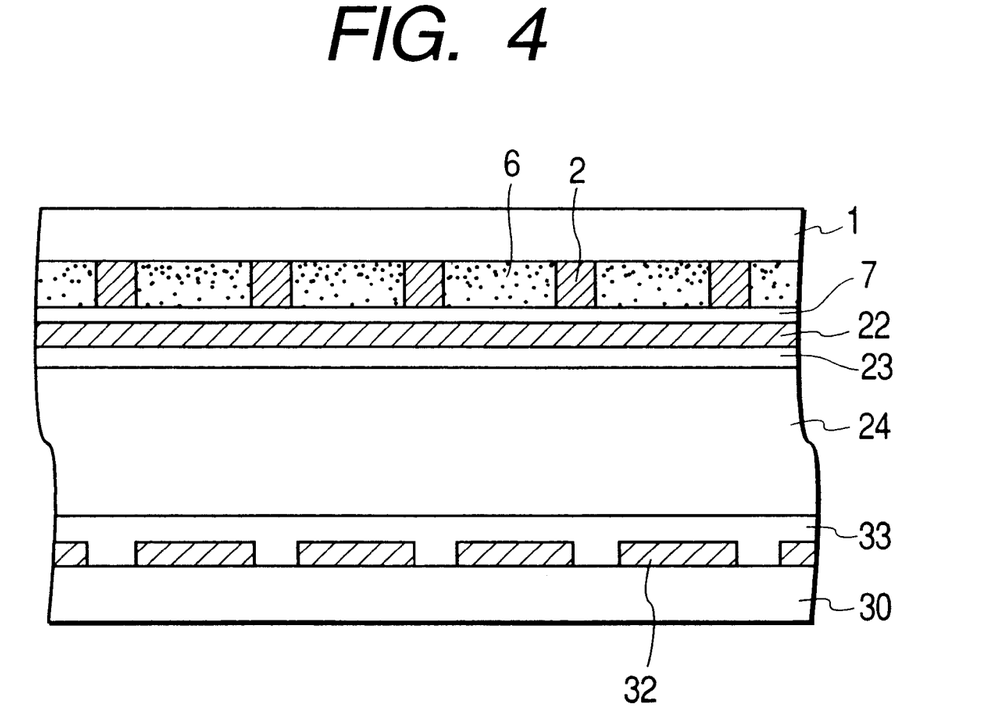
FIG. 4 is a schematic cross sectional view of an embodiment of a liquid crystal element according to the invention.

FIG. 4 is a schematic cross sectional view of an embodiment of a liquid crystal element according to the invention, which is an active matrix type liquid crystal element. In FIG. 4, there are shown a common electrode 22, an oriented film 23, a substrate 30, pixel electrodes 32, another oriented film 33 and a liquid crystal layer 24. The components same as those of FIGS. 1A through 1H are denoted respectively by the same reference symbols.

A liquid crystal element for color display is prepared generally by combining the substrate 1 on the side of a color filter and the TFT substrate 30 vis-a-vis, filling the gap between the two substrates with a liquid crystal compound 24 and hermetically sealing the substrates. TFTs (not shown) and transparent pixel electrodes 32 are formed on the inner surface of one of the substrates of the liquid crystal element, while a color filter layer is formed on the inner surface of the other substrate 1 with the colored portions 6 of R, G and B arranged at positions opposite to the respective pixel electrodes 32 and a transparent common electrode 22 is formed thereon to cover the entire surface. Then, the substrates are covered by the respective oriented films 23, 33 and the molecules of the liquid crystal can be oriented in one direction by rubbing the films.

A pair of polarizing plates (not shown) are bonded respectively to the outer surfaces of the substrates 1, 30 and the combination of a fluorescent lamp (not shown) and a scattering plate (not shown) is used as back light. Then, the liquid crystal compound is used as an optical shutter with a variable transmittivity for rays of light from the back light in order to display desired images.

While a liquid crystal element according to the invention comprises a color filter prepared according to the invention, known techniques can be used for all the other components, their materials and the methods of preparing them.

EXAMPLES

Example 1

Black resist (available from Shinnittetsu Chemical) was applied onto a glass substrate ("1737": tradename, available from Coning) and a latticework of a shielding layer (black matrix) was produced as a result of a process of exposure to light, development and post-baking. The obtained shielding layer had a height of 1.2 μm. Then, a photosensitive resin composite having the composition as listed below is applied thereto by spin-coating and pre-baked at 50° C. for 3 minutes to produce a 1.0 μm thick layer of the photosensitive resin composite.

| [photosensitive resin composite] | |
|---|---|
| copolyer having the following composition | 20 phr |
| hydroxyethylmethacrylate | 80 phr |
| vinylcinnamate | 10 phr |
| acrylic acid | 10 phr |

| -continued | |
|---|---|
| [photosensitive resin composite] | |
| bis-azide type photosensitizing agent ("A-066H": tradename, available from Sinko Giken) | 0.5 phr |
| ethylcellosolve | 79.5 phr |

The composite was entirely exposed to light having a wavelength of 365 nm and irradiated from the rear surface of the substrate at a rate of 200 mJ/cm$^2$. Then, it was developed in an alkaline aqueous solution (pH=10), rinsed with pure water and dried by means of a spin-drier to obtain a substrate having a black matrix and imbedded with coloring portions of the photosensitive resin composite in the openings of the black matrix.

Thereafter, inks of colorants of R, G and B were applied to the respective coloring portions by a predetermined amount by means of an ink-jet recording apparatus and it was confirmed that the inks had permeated satisfactorily into the coloring portions. Then, the portions that were already colored were subjected to heat treatment at 90° C. for 5 minutes and subsequently at 230° C. for 30 minutes to cure the colored portions.

| (ink compositions) | |
|---|---|
| R ink | |
| C. I. acid orange 148 | 6 phr |
| C. I. acid red 289 | 1 phr |
| diethyleneglycol | 30 phr |
| ion-exchanged water | 63 phr |
| G ink | |
| C. I. acid yellow 23 | 3 phr |
| zinc phthalocyaninesulfonamide | 3 phr |
| ditheylenglycol | 30 phr |
| ion-exchanged water | 64 phr |
| B ink | |
| C. I. direct blue 199 | 6 phr |
| diethyleneglycol | 30 phr |
| ion-changed water | 64 phr |

Figure 5:
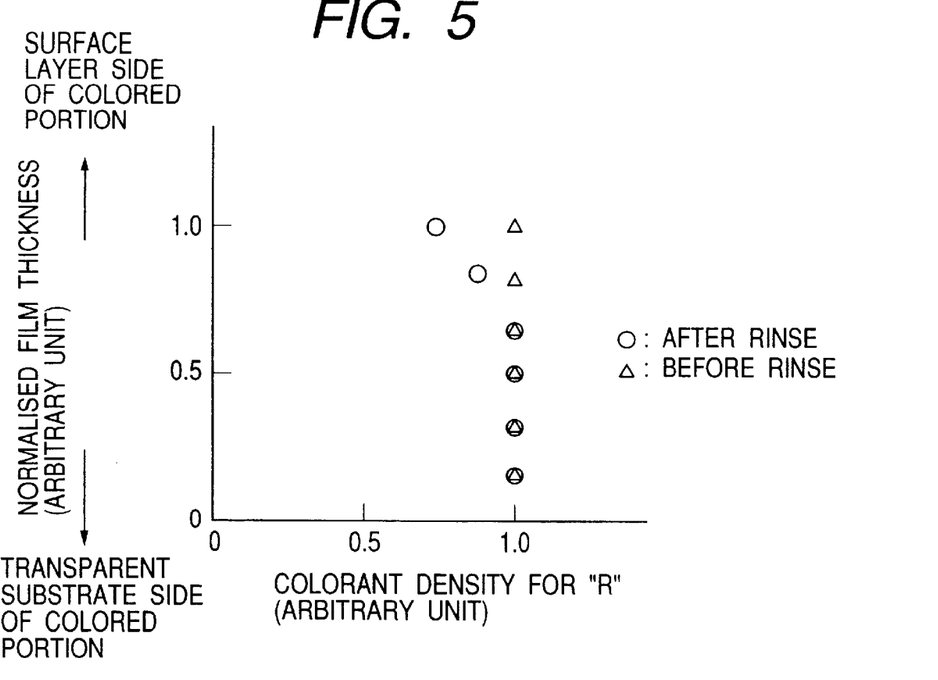
FIG. 5 is a graph summarily illustrating the result of measuring the dye densities of the R-colored portions of the color filter prepared in Example 1.
Figure 6:
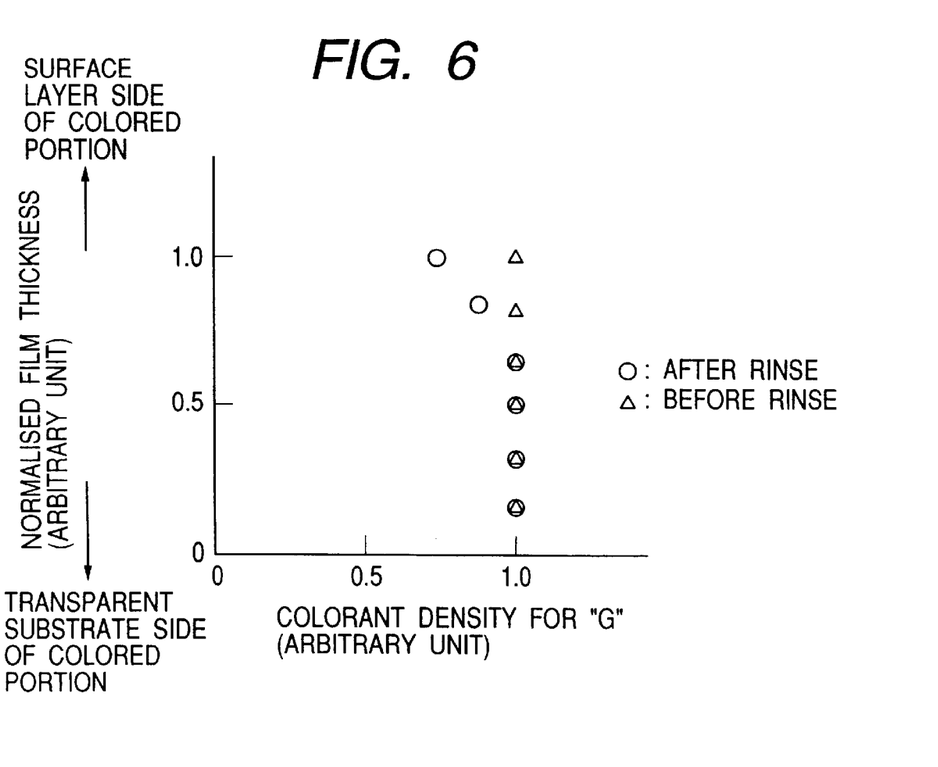
FIG. 6 is a graph summarily illustrating the result of measuring the dye densities of the G-colored portions of the color filter prepared in Example 1.
Figure 7:
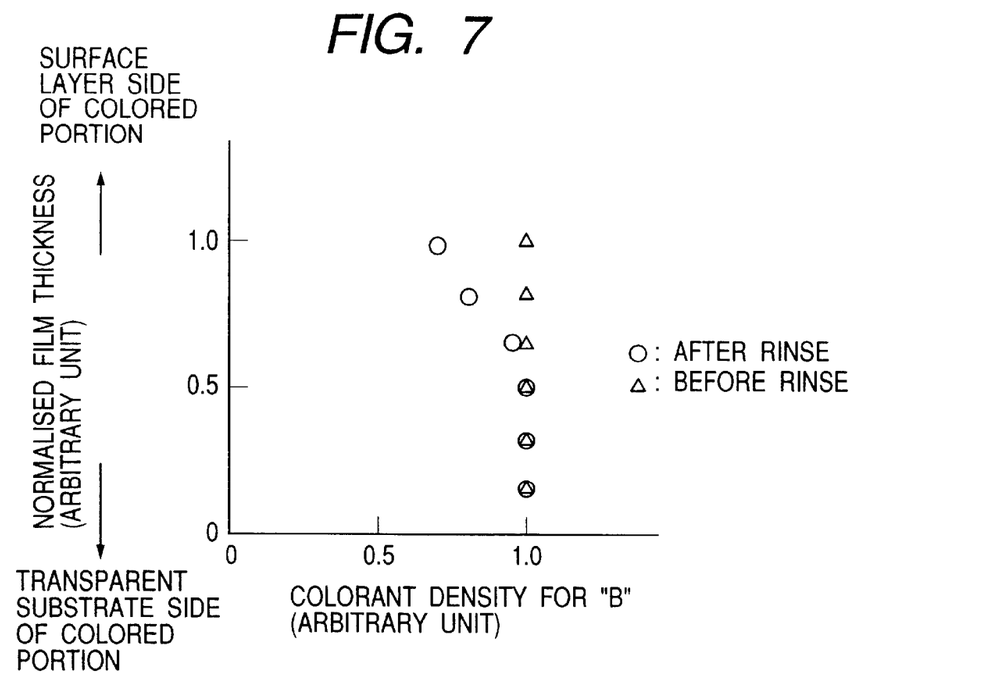
FIG. 7 is a graph summarily illustrating the result of measuring the dye densities of the B-colored portions of the color filter prepared in Example 1.

Subsequently, the colored portions were rinsed with pure water by means of a spin-rinsing technique. FIGS. 5 through 7 are graphs summarily illustrating the result of measuring the dye densities of the colored portions of the color filter prepared in Example I as observed along the thickness of the colored portions before and after the rinsing process. A SIMS (secondary ion mass spectrograph) was used for measuring the dye densities. The amounts of metal atoms (chromium atoms for R, zinc atoms for G and copper atoms for B) contained in each dye molecule were determined and compared with the amount of carbon atoms to obtain standardized respective densities. As clearly seen from FIGS. 5 through 7, all the dye densities of R, G and B of the colored portions were reduced on the surface as a result of the rinsing process.

Thereafter, a double-solution type thermosetting resin composite ("SS6699G": tradename, available from JSR) was applied onto the colored portions to a thickness of 1 μm by spin-coating and prebaked at 90° C. for 30 minutes. Then, the applied resin composite was subjected to heat treatment at 250° C. for 60 minutes to produce a protection layer.

The prepared color filter was then observed for the chromaticity of the colored portions by means of a microspectrometric analyzer (available from Olympus) to find no abnormality in the chromaticity. The protection layer was not exfoliated when subjected to a cross-cut peeling test.

Finally, a 0.12 μm thick ITO film was formed on the protection layer to complete the operation of preparing a liquid crystal element substrate. The chromaticity of the colored portions of the substrate were once again observed by means of a microspectrometric analyzer to find no abnormality in the chromaticity. The protection layer was not exfoliated when subjected to another cross-cut peeling test.

Example 2

The above described procedure of Example 1 was followed to obtain a color filter except that an alkaline aqueous solution (pH=11) was used as rinsing solution in this example. The chromaticity of the colored portions was measured by means of a microspectrometric analyzer as in Example 1 to find no abnormality. The protection layer was not exfoliated as a result of a cross-cut peeling test.

Example 3

The above described procedure of Example 1 was followed to obtain a liquid crystal element substrate except that an ITO film was formed directly on the colored portions without forming a protection layer in this example. The chromaticity of the colored portions was measured by means of a microspectrometric analyzer as in Example 1 to find no abnormality. The ITO film was not exfoliated as a result of a cross-cut peeling test.

Comparative Example 1

The above described procedure of Example 1 was followed to obtain a liquid crystal element substrate except that no rinsing operation was conducted in this example. The chromaticity of the colored portions was measured by means of a microspectrometric analyzer as in Example 1 to find a phenomenon of spectral change due to the migration of dyes into the protection layer. Additionally, the protection layer was exfoliated as a result of a cross-cut peeling test.

Comparative Example 2

The above described procedure of Example 3 was followed to obtain a color filter in this example except that no rinsing operation was conducted in this example. The chromaticity of the colored portions was measured by means of a microspectrometric analyzer as in Example 1 to find a phenomenon of spectral change due to the oxidation of dyes. Additionally, the ITO film was exfoliated as a result of a cross-cut peeling test.

Example 4

A black matrix was formed on a glass substrate as in Example 1 and then curable inks of R, G and B were applied to the respective coloring portions by a predetermined amount. Then, the portions that were already colored were subjected to heat treatment at 90° C. for 5 minutes and subsequently at 230° C. for 30 minutes to cure the colored portions.

| (compositions of curable inks) | |
|---|---|
| R ink | |
| R dye | 4 phr |
| pure water | 56 phr |
| diethyleneglycol | 30 phr |
| curable type acryl resin | 10 phr |
| G ink | |
| G dye | 3 phr |
| pure water | 57 phr |
| ditheylenglycol | 30 phr |
| curable type acryl resin | 10 phr |
| B ink | |
| B dye | 5 phr |
| pure water | 45 phr |
| diethyleneglycol | 40 phr |
| curable type acryl resin | 10 phr |

Subsequently, the colored portions were rinsed with pure water by means of a spin-rinsing technique. Then, as in Example 1, a SIMS (secondary ion mass spectrograph) was used for measuring the dye densities to find that all the dye densities of R, G and B of the colored portions had been reduced on the surface as a result of the rinsing process.

Thereafter, a protection layer was formed on the colored portions as in Example 1.

Then, as in Example 1, the prepared color filter was then observed for the chromaticity of the colored portions by means of a microspectrometric analyzer to find no abnormality in the chromaticity. The protection layer was not exfoliated when subjected to a cross-cut peeling test.

Finally, a 0.12 μm thick ITO film was formed on the protection layer as in Example 1 to complete the operation of preparing a liquid crystal element substrate. The chromaticity of the colored portions of the substrate were once again observed by means of a microspectrometric analyzer to find no abnormality in the chromaticity. The protection layer was not exfoliated when subjected to another cross-cut peeling test.

Example 5

The above described procedure of Example 4 was followed to obtain a color filter except that an alkaline aqueous solution (pH=11) was used as rinsing solution in this example. The chromaticity of the colored portions was measured by means of a microspectrometric analyzer as in Example 4 to find no abnormality. The protection layer was not exfoliated as a result of a cross-cut peeling test.

Example 6

The above described procedure of Example 4 was followed to obtain a liquid crystal element substrate except that an ITO film was formed directly on the colored portions without forming a protection layer in this example. The chromaticity of the colored portions was measured by means of a microspectrometric analyzer as in Example 1 to find no abnormality. The ITO film was not exfoliated as a result of a cross-cut peeling test.

Comparative Example 3

The above described procedure of Example 4 was followed to obtain a liquid crystal element substrate except that no rinsing operation was conducted in this example. The chromaticity of the colored portions was measured by means of a microspectrometric analyzer as in Example 4 to find a phenomenon of spectral change due to the migration of dyes into the protection layer. Additionally, the protection layer was exfoliated as a result of a cross-cut peeling test.

Comparative Example 4

The above described procedure of Example 6 was followed to obtain a color filter in this example except that no rinsing operation was conducted in this example. The chromaticity of the colored portions was measured by means of a microspectrometric analyzer as in Example 6 to find a phenomenon of spectral change due to the oxidation of dyes. Additionally, the ITO film was exfoliated as a result of a cross-cut peeling test.

Example 7

A latticework of a 0.15 μm thick shielding layer (black matrix) of chromium was formed on a glass substrate. Then, a photosensitive resin composite obtained by dissolving 97 phr of an acryl type copolymer having the composition as listed below

| | |
|---|---|
| methylmethacrylate | 50 phr; |
| hydroxyethylmethacrylate | 30 phr; and |
| N-methylolacrylamide | 20 phr | and 3 phr of triphenylsulfoniumtriflate dissolved in ethylcellosolve was applied thereto by spin-coating to a film thickness of 2 μm and pre-baked at 90° C. for 20 minutes to produce an ink-receiving layer.

Thereafter, the ink-receiving layer on the black matrix was partly exposed to light with a photomask having stripe-shaped openings of a width smaller than that of the black matrix interposed therebetween to produce a pattern, which was then subjected to heat treatment on a hot plate at 120° C. for 1 minute to produce coloring portions and non-coloring portions in the ink-receiving layer.

Thereafter, inks of colorants of R, G and B were applied to the respective coloring portions by a predetermined amount by means of an ink-jet recording apparatus.

After allowing the inks to satisfactorily permeate into the coloring portions, the portions that had been already colored were subjected to heat treatment at 90° C. for 5 minutes and subsequently at 200° C. for 60 minutes to cure the colored portions.

Figure 8:
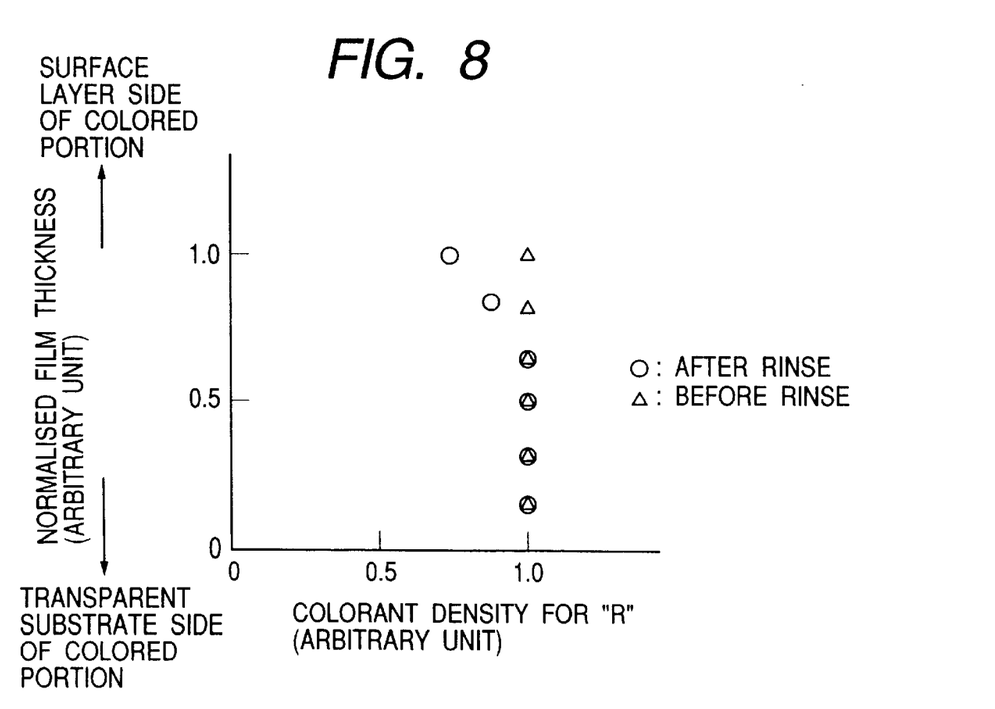
FIG. 8 is a graph summarily illustrating the result of measuring the dye densities of the R-colored portions of the color filter prepared in Example 7.
Figure 9:
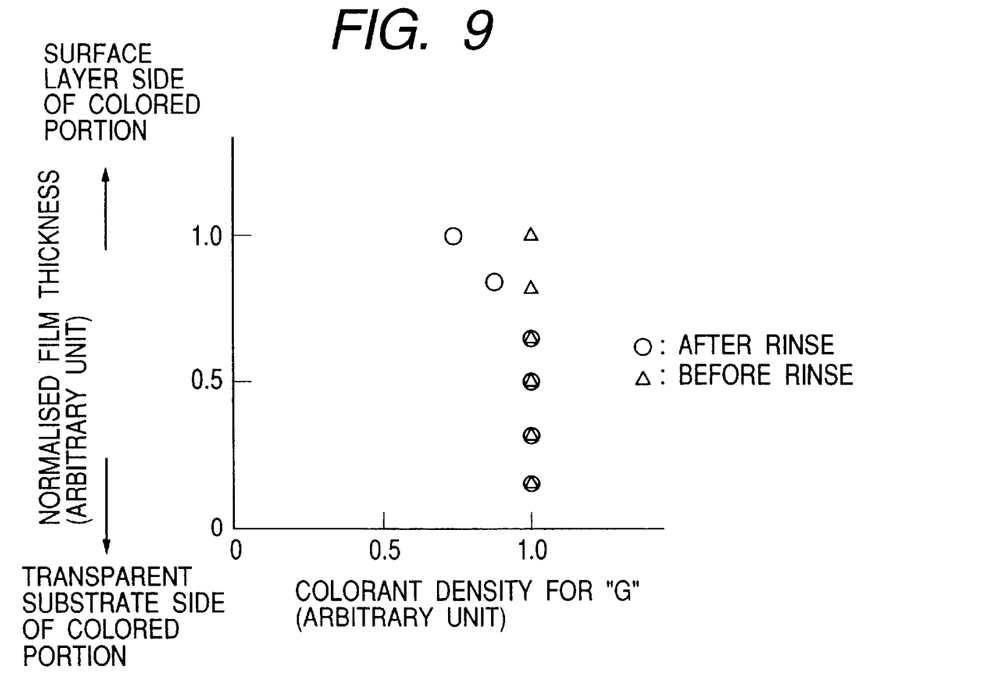
FIG. 9 is a graph summarily illustrating the result of measuring the dye densities of the G-colored portions of the color filter prepared in Example 7.
Figure 10:
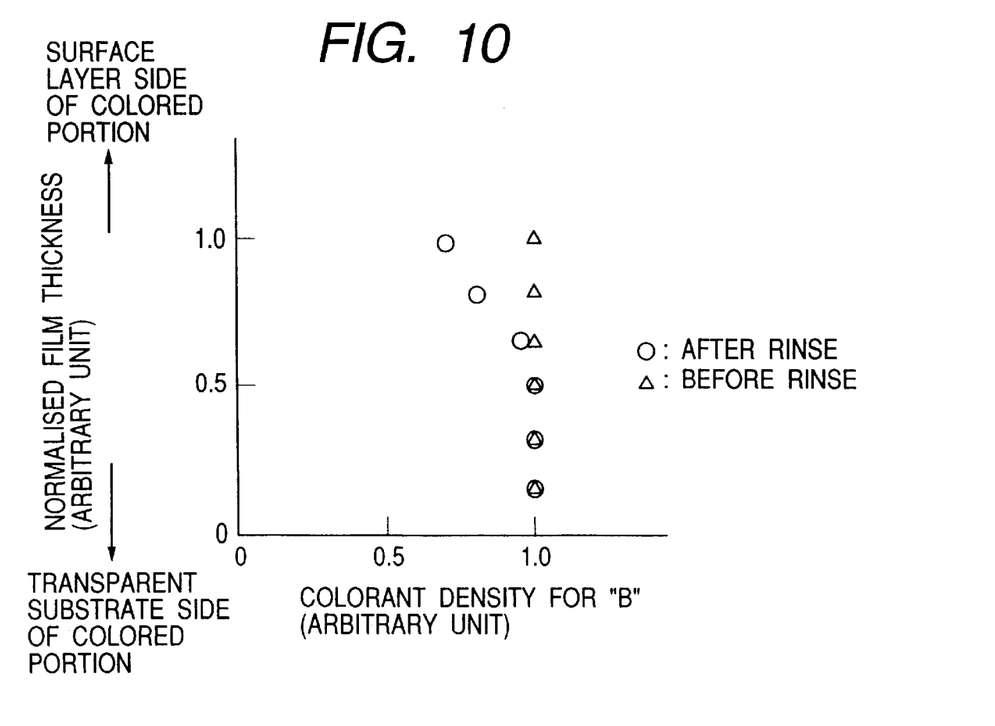
FIG. 10 is a graph summarily illustrating the result of measuring the dye densities of the B-colored portions of the color filter prepared in Example 7.

Subsequently, the colored portions were rinsed with pure water by means of a spin-rinsing technique. FIGS. 8 through 10 are graphs summarily illustrating the result of measuring the dye densities of the colored portions of the color filter prepared in Example 7 as observed along the thickness of the colored portions before and after the rinsing process in a manner as described for Example 1. As clearly seen from FIGS. 8 through 10, all the dye densities of R, G and B of the colored portions were reduced on the surface as a result of the rinsing process.

Thereafter, a double-solution type thermosetting resin composite ("SS6699G": tradename, available from JSR) was applied onto the colored portions to a thickness of 1 μm by spin-coating and prebaked at 90° C. for 30 minutes. Then, the applied resin composite was subjected to heat treatment at 250° C. for 60 minutes to produce a protection layer.

The prepared color filter was then observed for the chromaticity of the colored portions by means of a microspectrometric analyzer (available from Olympus) to find no abnormality in the chromaticity. The protection layer was not exfoliated when subjected to a cross-cut peeling test.

Finally, a 0.12 μm thick ITO film was formed on the protection layer to complete the operation of preparing a liquid crystal element substrate. The chromaticity of the colored portions of the substrate were once again observed by means of a microspectrometric analyzer to find no abnormality in the chromaticity. The protection layer was not exfoliated when subjected to another cross-cut peeling test.

Example 8

The above described procedure of Example 7 was followed to obtain a color filter except that an alkaline aqueous solution (pH=11) was used as rinsing solution in this example. The chromaticity of the colored portions was measured by means of a microspectrometric analyzer as in Example 7 to find no abnormality. The protection layer was not exfoliated as a result of a cross-cut peeling test.

Example 9

The above described procedure of Example 7 was followed to obtain a liquid crystal element substrate except that an ITO film was formed directly on the colored portions without forming a protection layer in this example. The chromaticity of the colored portions was measured by means of a microspectrometric analyzer as in Example 7 to find no abnormality. The ITO film was not exfoliated as a result of a cross-cut peeling test.

Comparative Example 5

The above described procedure of Example 7 was followed to obtain a liquid crystal element substrate except that no rinsing operation was conducted in this example. The chromaticity of the colored portions was measured by means of a microspectrometric analyzer as in Example 7 to find a phenomenon of spectral change due to the migration of dyes into the protection layer. Additionally, the protection layer was exfoliated as a result of a cross-cut peeling test.

Comparative Example 6

The above described procedure of Example 9 was followed to obtain a color filter in this example except that no rinsing operation was conducted in this example. The chromaticity of the colored portions was measured by means of a microspectrometric analyzer as in Example 7 to find a phenomenon of spectral change due to the oxidation of dyes. Additionally, the ITO film was exfoliated as a result of a cross-cut peeling test.

As described above in detail, since the optical density of the colored portions is made low on the surface in a color filter according to the invention, the migration of the colorants from the colored portions is minimized along the interface of the colored portions and the protection layer, if such a protection layer is formed; and the protection layer can be prevented from the deterioration of adhesion and from being colored with dyes. Additionally, when a transparent electro-conductive film is formed on the colored portions, the phenomenon of change of the color tone of the colorants due to oxidation can be effectively suppressed to minimize the possible degradation of the contrast of the color filter because the exposure to the oxygen containing atmosphere of the colorants is minimized in the step of forming a transparent electro-conductive film.

Thus, the present invention provides a color filter comprising colored portions and a protection layer that firmly adhere to each other, while minimizing the possible coloring of the protection layer and a liquid crystal element substrate that is free from any change of color tone and shows an excellent contrast as well as a liquid crystal element showing excellent color display characteristics and high reliability.

What is claimed is:

1. A color filter comprising a substrate, a shielding layer formed on the substrate and having openings, and colored portions formed in said openings by using colorants, the optical density of said colored portions being raised toward the substrate.

2. A color filter according to claim 1, wherein said shielding layer is made of a black resin.

3. A color filter according to claim 1, wherein said colorants are dyes.

4. A color filter according to claim 1, wherein said colorants are pigments.

5. A color filter according to claim 1, further comprising a protection layer on the surface thereof.

6. A method manufacturing a color filter, comprising the steps of forming a shielding layer having openings on a substrate, forming a photosensitive resin on said substrate and said shielding layer, applying colorants to color said photosensitive resin, and removing some of the colorants to achieve a desired optical density profile.

7. A method of manufacturing a color filter according to claim 6, wherein said coloring step uses an ink-jet system.

8. A method of manufacturing a color filter, comprising the steps of forming a shielding layer having openings on a substrate, applying inks containing colorants to said openings, producing colored portions by curing said inks, and removing some of the colorant to achieve a desired optical density of said colored portions.

9. A method of manufacturing a color filter according to claim 8, wherein said coloring step uses an ink-jet system.

10. A color filter comprising a substrate, a shielding layer formed on the substrate and having an opening, color mixing prevention barriers formed on said shielding layer, and colored portions formed between said color mixing prevention barriers, the optical density of said colored portions being raised toward the substrate.

11. A color filter according to claim 10, wherein said shielding layer is made of metal.

12. A color filter according to claim 10, wherein said colorants are dyes.

13. A color filter according to claim 10, wherein said colorants are pigments.

14. A color filter according to claim 10, further comprising a protection layer on the surface thereof.

15. A method of manufacturing a color filter, comprising the steps of forming a shielding layer having openings on a substrate, forming a photosensitive resin on said substrate and said shielding layer, forming color mixing prevention barriers by patterning said photosensitive resin by exposing it to light, applying colorants to color said photosensitive resin between said color mixing prevention barriers, and removing some of the colorants to achieve a desired optical density profile.

16. A method of manufacturing a color filter according to claim 15, wherein said coloring step uses an ink-jet system.

17. A liquid crystal element substrate, comprising a transparent electro-conductive film formed on the surface of the color filter according to claim 1 or 10.

18. A liquid crystal element substrate according to claim 17, further comprising a protection layer between said color filter and said transparent electro-conductive film.

19. A liquid crystal element, comprising a liquid crystal element substrate prepared having a transparent electro-conductive film formed on the color filter according to claim 1 or claim 10, an opposite substrate arranged vis-a-vis relative to said liquid crystal element substrate, and a liquid crystal filled into the gap between said liquid crystal substrate and said opposite substrate, said liquid crystal substrate and said opposite substrate being hermetically sealed.

20. A liquid crystal element according to claim 19, further comprising a protection layer between said color filter and said transparent electro-conductive film.

* * * * *

UNITED STATES PATENT AND TRADEMARK OFFICE
CERTIFICATE OF CORRECTION

PATENT NO.    : 6,309,783 B1
DATED         : October 30, 2001
INVENTOR(S)   : Shoji Shiba et al.

It is certified that error appears in the above-identified patent and that said Letters Patent is hereby corrected as shown below:

Column 1,
Line 14, "substract." should read -- substrate. --; and
Line 64, "color" should read -- colors --.

Column 3,
Line 26, "1A, 1B, 1C, 1D, 1E, 1F, 1G and H" should read -- 1A to 1H --;
Line 27, "an" (2nd occurrence) should read -- a --;
Line 29, "2A, 2B, 2C, 2D and 2E" should read -- 2A to 2E --; and
Line 32, "3A, 3B, 3C, 3D, 3E, 3F and 3G" should read -- 3A to 3G --.

Column 4,
Line 4, "made" should read -- be made --;
Line 21, "effect," should read -- effect; -- and
Line 27, "that" should be deleted.

Column 5,
Line 22, "ink-Jet" should read -- ink-jet --; and
Line 26, "fact" should read -- fact that --.

Column 6,
Line 29, "materials" should read -- material --.

Column 8,
Line 22, "a ink-" should read -- an ink --.

Column 9,
Line 51, "Coning)" should read -- Corning) --;
Line 55, "is" should read -- was --; and
Table, at line 1, below "[photosensitive resin composite]", "copolyer" should read -- copolymer --.

UNITED STATES PATENT AND TRADEMARK OFFICE
CERTIFICATE OF CORRECTION

PATENT NO.    : 6,309,783 B1
DATED         : October 30, 2001
INVENTOR(S)   : Shoji Shiba et al.

It is certified that error appears in the above-identified patent and that said Letters Patent is hereby corrected as shown below:

Column 10,
Table, 9$^{th}$ entry, "ditheyleneglycol" should read -- diethyleneglycol -- and at 14$^{th}$ entry, "ion-changed" should read -- ion-exchanged --.

Column 12,
Table, 9$^{th}$ entry, "ditheyleneglycol" should read -- diethyleneglycol --; and
Line 30, "then" should be deleted.

Column 13,
Line 20, "obtained" should read -- was obtained --.

Column 15,
Line 22, "manufacturing" should read -- of manufacturing --.

Signed and Sealed this

Eighteenth Day of June, 2002

Attest:

JAMES E. ROGAN
*Attesting Officer*      *Director of the United States Patent and Trademark Office*